G. A. SCHEEFFER.
ELECTRIC METER.
APPLICATION FILED JAN. 26, 1910.

995,637.

Patented June 20, 1911.

2 SHEETS—SHEET 1.

Witnesses
Milton Lenoir
L. W. Novander

Inventor
Gustave A. Scheeffer,
By Browns William
Attorneys.

G. A. SCHEEFFER.
ELECTRIC METER.
APPLICATION FILED JAN. 26, 1910.

995,637.

Patented June 20, 1911.

2 SHEETS—SHEET 2.

Witnesses
Milton Lenoir
L. W. Novander

Inventor
Gustave A. Scheeffer
By Brown & Williams
Attorneys.

UNITED STATES PATENT OFFICE.

GUSTAVE A. SCHEEFFER, OF INDIANAPOLIS, INDIANA, ASSIGNOR TO COLUMBIA METER COMPANY, OF INDIANAPOLIS, INDIANA, A CORPORATION OF INDIANA.

ELECTRIC METER.

995,637.        Specification of Letters Patent.    Patented June 20, 1911.

Application filed January 26, 1910. Serial No. 540,153.

*To all whom it may concern:*

Be it known that I, GUSTAVE A. SCHEEFFER, a citizen of the United States, residing at Indianapolis, in the county of Marion and State of Indiana, have invented a certain new and useful Improvement in Electric Meters, of which the following is a full, clear, concise, and exact description, reference being had to the accompanying drawings, forming a part of this specification.

My invention relates to an improved form of electricity meters adapted to measure a quantity of electricity flowing through any given circuit.

My improved meter construction provides for accuracy of operation, ease of inspection and repair, and durability of working parts.

My invention consists particularly in an improved construction for supporting the gearing connected with a movable armature of a meter of the class referred to, the integrating mechanism driven by such gearing, such supporting means also serving to support the magnetic shield between the retarding magnets of the meter and the operating windings and also a starting coil rheostat adapted to be used in connection with the starting coil coöperating with the armature to overcome the friction of the moving parts.

My invention further consists in disposing the resistance, normally connected in series with the armature, in such a manner upon one of the bolts used to hold the meter cover in place that practically no additional space is occupied by the resistance and that it is securely held in a readily accessible position.

Figure 1:
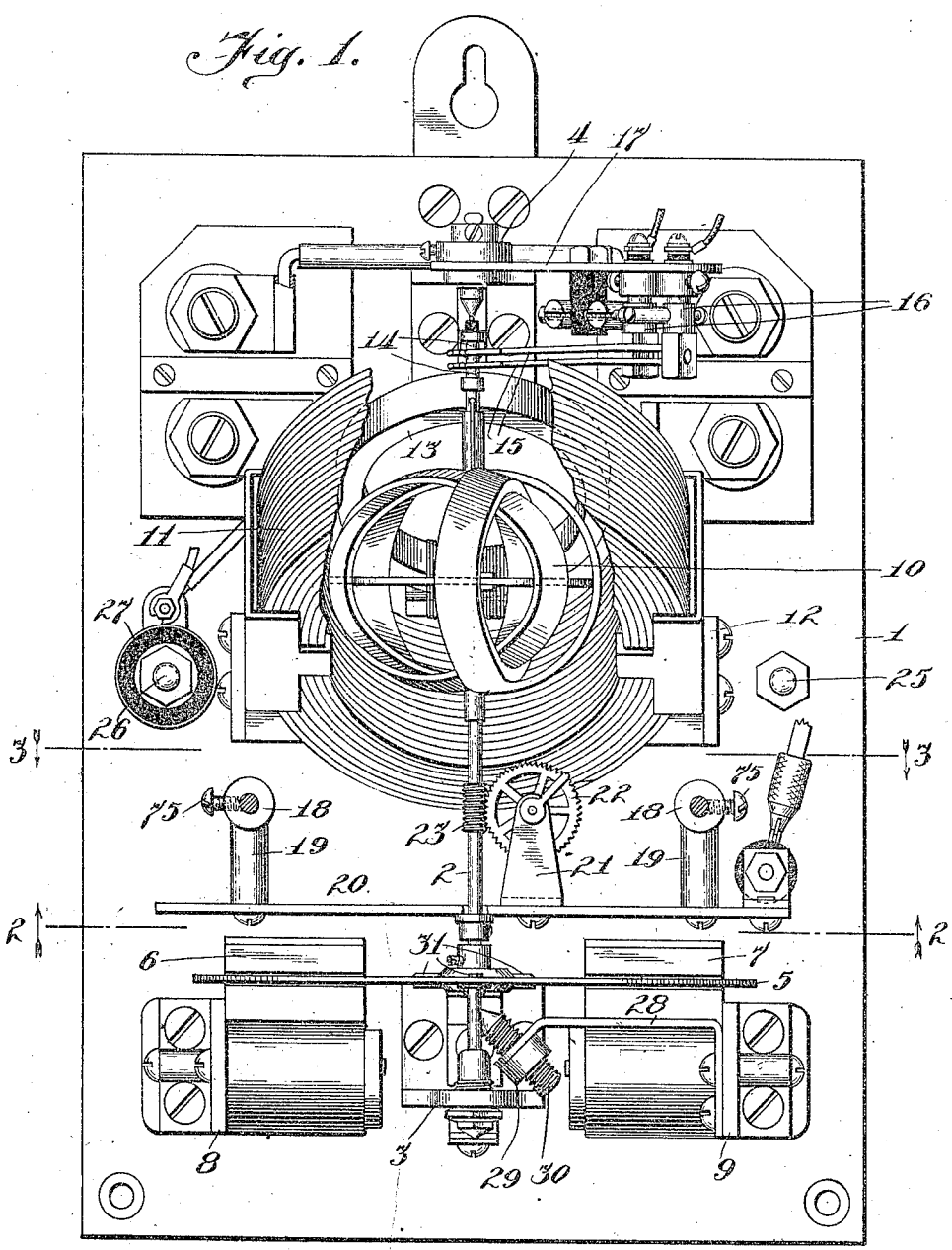
Figure 2:
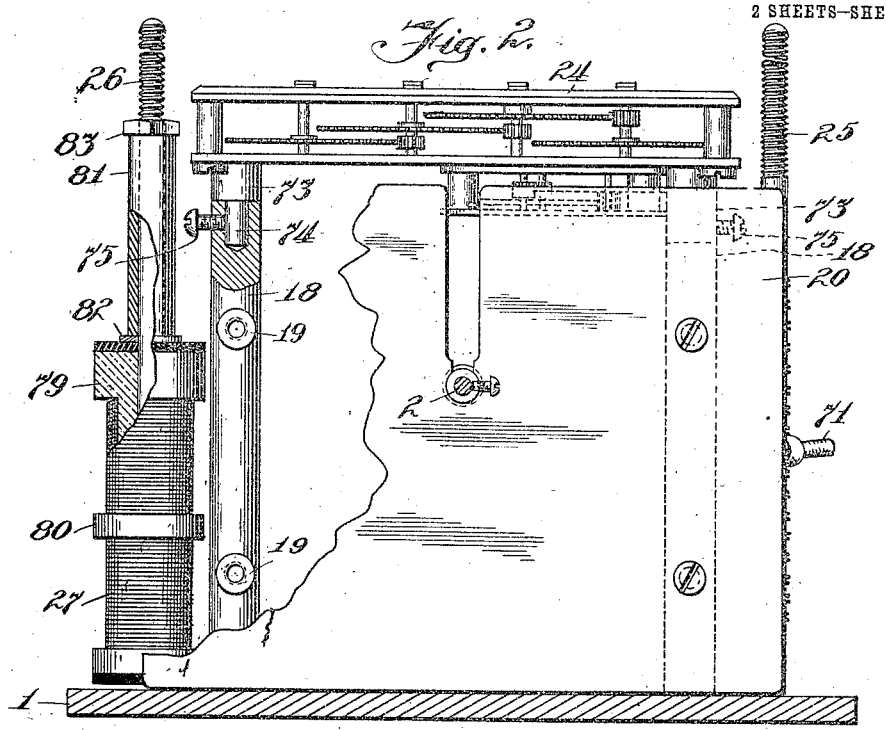
Figure 3:
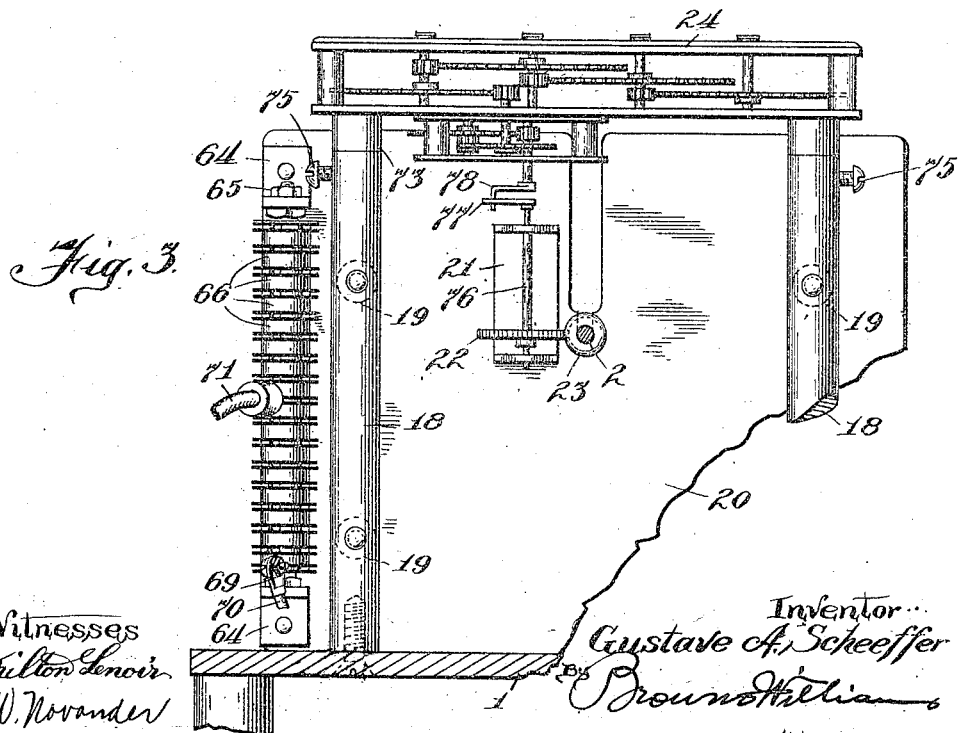

The several drawings illustrating my invention are as follows: Figure 1 is a plan view of the meter mechanism complete with the casing thereof removed, and in this figure a portion of the field coil is broken away to show more clearly the armature windings and the starting coil. Fig. 2 is a sectional view of the parts shown in Fig. 1 taken along the line 2—2, a portion of the parts being broken away to more clearly show the construction. Fig. 3 is a view of the parts shown in Fig. 1 taken along the line 3—3.

Similar numerals refer to similar parts throughout the several views.

As shown in the drawings, the base 1 supports an armature shaft 2 by means of a lower bearing 3 and an upper bearing 4. The shaft 2 carries near its lower end a disk 5 of nonmagnetic material disposed between the poles of permanent magnets 6 and 7 held in proper position by the brackets 8 and 9 secured to the base plate 1. The shaft 2 has mounted thereon three armature coils 10 disposed in operative relation to a field coil 11 supported by brackets 12 from the base plate 1. A starting coil 13 is also supported from the base 1 in suitable manner so as to occupy a position practically parallel with the field coil 11, the function of this starting coil being to exert a rotative tendency upon the armature windings to compensate for the friction of the moving parts. A commutator 14 is carried by the upper end of the armature shaft 2 and is connected with the windings 10. Brushes 15 are supported by brush holders 16 from the rocker arm 17 in such a manner as to rest upon the commutator 14. The rocker arm 17 is supported from the upper bearing 4 of the shaft 2.

The disk 5 carries three bodies 31 of nonmagnetic material so disposed that they move with the disk 5 in a path adjacent to the point of a screw 30 adjustably supported by a nut 29 held in place by a bracket 28 so disposed relatively to one of the poles of the magnet 7 that the screw 30 is magnetized by such pole. The bodies 31 and the magnetized screw 30 coöperate with the action of the starting coil 13 upon the armature coils 10 so that the rotative effort of the starting coil upon such windings is uniformly distributed. The combination just referred to is not claimed in the present application as it forms the subject matter of my co-pending application, Serial No. 538,026.

Main supporting posts 18 extend outwardly from and are rigidly secured to the base plate 1 and by means of arms 19 support a magnetic shield 20 between the permanent magnets 6 and 7 and the field coil and armature windings. The plate 20 has secured thereto a bracket 21 which forms the bearings for the worm wheel 22 engaging the worm 23 on the shaft 2. The posts 18 also serve to support the integrating mechanism 24 shown in Fig. 2.

Posts 25 and 26 extending outwardly from and rigidly secured to the base plate 1, are provided to secure the cover in place to protect the operating mechanism of the meter. A resistance coil 27 is disposed upon the post 26 as indicated, such resistance coil being connected in series with the armature as is the usual practice.

The integrating mechanism 24 is supported by two posts 73 secured thereto and having reduced cylindrical extensions 74 extending therefrom adapted to fit into suitable holes drilled longitudinally in the outer ends of the post 18. Clamping screws 75 are provided to retain the integrating mechanism in place.

As shown in Fig. 3, the worm wheel 22 is secured to a shaft 76 which is supported by the bracket 21 from the shield 20. The shaft 76 has secured thereto at its upper end an arm 77 adapted to engage a crank 78 secured to the lower end of the operating shaft of the integrating mechanism 24. As a result of this construction the integrating mechanism may be readily removed from the posts 18 by loosening the screws 75 since there is no fixed or rigid connection between the operating shaft of the integrating mechanism and the shaft 76.

The magnetic shield 20 also supports by the brackets 64 a rod 65 upon which resistance coils 66 are mounted, these resistance coils being connected together in series and adapted to be included in circuit with the starting coil 13 of the meter. Terminals 67 are provided to facilitate any desired adjustment of the connecting socket 73 which may be connected by the conductor 71 with one terminal of the starting coil, while the other terminal 70 of the resistance is connected to the other terminal of such starting coil.

As shown in Fig. 2, the resistance coil 27 is wound upon the bobbin or spool 79 of insulating material which, besides being provided with end flanges, has a central flange 80 to provide a more positive support and better protection to the resistance coil 27. It is to be understood that both sections of the coil constitute in effect one resistance to be connected in series with the armature. The bobbin 79 is mounted upon the rod 26 and held in place by means of a sleeve 81 which engages a washer 82 resting upon, but insulated from the upper end of the bobbin 79 and this sleeve is held in place by a nut 83 engaging the threaded end of the rod 26. In this way the resistance is disposed in a readily accessible position and requires a minimum amount of room to accommodate it, no extra supporting means being required for this purpose.

While I have shown my meter construction in the particular embodiment herein described, I do not, however, limit myself to this construction, but desire to claim broadly any equivalent that may suggest itself to those skilled in the art.

What I claim is:

1. In an electric meter, the combination of a rotatable armature, a field coil disposed in operative relation thereto, a base plate, a casing for the meter, posts extending from the base plate through the casing to secure the same in place, a spool of insulating material mounted upon one of such posts, and a resistance wound in sections upon such spool and serially included in the armature circuit.

2. In an electric meter, the combination of a rotatable armature, a field coil disposed in operative relation thereto, a base plate, a casing for the meter, posts extending from the base plate through the casing to secure the same in place, a spool of insulating material through which one of such posts extends, a nut upon such post for holding the spool in place, and a resistance wound in sections upon such spool and serially included in the armature circuit.

In witness whereof, I hereunto subscribe my name this 22nd day of January, 1910.

GUSTAVE A. SCHEEFFER.

Witnesses:
PHOEBE HILL,
J. E. SCOTT.